United States Patent Office 2,695,213
Patented Nov. 23, 1954

2,695,213

RECOVERY OF ZIRCONIUM TETRACHLORIDE FROM ITS COMPLEX COMPOUNDS

Willis C. Fernelius, State College, Pa., assignor to the United States of America as represented by the United States Atomic Energy Commission No Drawing. Application May 6, 1952,
Serial No. 286,429

3 Claims. (Cl. 23—87)

This invention relates to the metallurgy of zirconium and more particularly to the recovery of zirconium tetrachloride from complex compounds thereof with certain phosphorus chlorides as a step in the production of substantially pure zirconium metal.

In recent years there has developed a substantial demand for substantially pure zirconium metal. In most of its ores zirconium is associated with hafnium and can be separated from hafnium only with considerable difficulty. One promising process that has been previously proposed for effecting this separation involves the conversion of the zirconium into its tetrachloride and the formation therefrom of a complex compound with a phosphorus chloride such as $PCl_5$ or $POCl_3$. These complex compounds are relatively stable liquids that can be boiled without decomposition and thus it is feasible to separate them from the corresponding hafnium compounds by distillation and thereby effect the desired separation between zirconium and hafnium.

One factor that has retarded the general adoption of this process is the difficulty of breaking down the distilled complex compound after its distillation and separation from the corresponding hafnium compound to recover the zirconium tetrachloride therefrom. Heretofore, it has been thought necessary to convert the complex compound to zirconium oxide and then reconvert to a halide for metallurgical operations. So far as I am aware, no satisfactory process has been previously proposed for recovering the zirconium tetrachloride directly from the complex.

It is accordingly an object of the present invention to provide a method of recovering zirconium tetrachloride from a complex compound such as that which it forms with $PCl_5$ and $POCl_3$. It is a further object of the invention to provide a simple and efficient process of this character which produces a relatively high yield of the desired product. Other objects of the invention will be in part obvious and in part pointed out hereinafter.

In one of its broader aspects the present method comprises treating the complex compound with a reducing agent selected from the group consisting of magnesium metal and elemental phosphorus and then heating the reaction mixture in two stages, a first stage wherein phosphorus trichloride is vaporized and a second stage wherein zirconium tetrachloride is vaporized. The tetrachloride vapors are condensed to recover zirconium tetrachloride in solid form. The proportions in which the complex compound and reducing agent are mixed do not appear to be particularly critical although, in general, it is desirable to mix the reactants in approximately stoichiometrical proportions. Where magnesium is used a slight deficiency of magnesium appears to be desirable. The general nature of the reaction that occurs is indicated by the following equations which are written for the case wherein magnesium is used as the reducing agent.

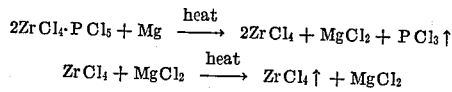

It is apparent from these equations that the phosphorus pentachloride is reduced to the trichloride and vaporized from the mixture in the first stage of the reaction and that the zirconium tetrachloride is vaporized from the residue consisting primarily of magnesium chloride in the second stage of the reaction.

The reaction mixture is desirably heated in the initial stage of the reaction to a temperature of 100° to 225° C. to vaporize the phosphorus trichloride therefrom, and also in the cases where phosphorus is used as a reducing agent to vaporize excess phosphorus. Upon completion of the first stage of the process the temperature is raised to 275° to 350° C. in which range the zirconium tetrachloride vaporizes and can be removed and condensed to recover a substantially pure product.

In order to point out more fully the nature of the present invention the following examples are given of illustrative methods of carrying out the invention.

Example 1

Two grams of the zirconium tetrachloride-phosphorus pentachloride complex ($2ZrCl_4 \cdot PCl_5$) were mixed with about 0.05 gram of magnesium metal and the mixture placed in a closed vessel under a nitrogen atmosphere. The mixture was heated to raise its temperature slowly and at about 200° C. fused together and gave off a white vapor. This vapor was condensed to form a colorless liquid which was found to be $PCl_3$. When the mixture stopped giving off the white vapor, it was further heated under reflux and a condensate was collected at a temperature of about 330° C. Upon cooling this condensate solidified to form substantially pure solid zirconium tetrachloride.

Example 2

To 6 grams of $2ZrCl_4 \cdot PCl_5$ was added 0.3 gram of elemental phosphorus. The phosphorus was weighed under water and then dried before being added to the complex compound. No reaction occurred at room temperature but upon gentle heating, a very vigorous reaction took place with the evolution of a dense white smoke which condensed to yield a colorless liquid. This liqud had a boiling point of about 70 to 74° C. and was found to be largely phosphorus chloride.

The heating was continued and at about 130° C. a quantity of yellow vapor distilled which burned in air with a green-blue flame and was presumably excess phosphorus. Upon continued heating a further portion of the reaction mixture sublimed at about 300 to 320° C. and was condensed as solid zirconium chloride.

From the foregoing description it will be apparent that the present invention provides an unusual effective method of breaking down zirconium tetrachloride-phosphorus chloride complexes to recover zirconium tetrachloride therefrom. It is of course to be understood that the foregoing description is illustrative only and that numerous changes can be made therein without departing from the spirit of the invention as set forth in the appended claims.

I claim:

1. The method of recovering $ZrCl_4$ from $2ZrCl_4 \cdot PCl_5$ which comprises mixing said $2ZrCl_4 \cdot PCl_5$ with a reducing agent selected from the group consisting of magnesium and phosphorus, said reducing agent being present in said reaction mixture in an amount not substantially greater than that required to convert the $PCl_5$ of said $2ZrCl_4 \cdot PCl_5$ to $PCl_3$, heating the reaction mixture to 100°–225° C. to vaporize $PCl_3$ therefrom, thereafter heating the reaction mixture to 275°–350° C. to vaporize $ZrCl_4$ therefrom, and condensing the vaporized $ZrCl_4$.

2. The method of recovering $ZrCl_4$ from $2ZrCl_4 \cdot PCl_5$ which comprises mixing said $2ZrCl_4 \cdot PCl_5$ with magnesium metal to form a reaction mixture, said magnesium metal being present in said reaction mixture in an amount not substantially greater than that required to convert the $PCl_5$ of said $2ZrCl_4 \cdot PCl_5$ to $PCl_3$, fusing said mixture and vaporizing $PCl_3$ therefrom by heating to approximately 200° C., thereafter heating said reaction mixture to approximately 330° C. to vaporize $ZrCl_4$ therefrom, and condensing the vaporized $ZrCl_4$.

3. The method of recovering $ZrCl_4$ from $2ZrCl_4 \cdot PCl_5$ which comprises mixing said $2ZrCl_4 \cdot PCl_5$ with phosphorus to form a reaction mixture, said phosphorus being present in said reaction mixture in an amount not substantially greater than that required to convert the $PCl_5$ of said $2ZrCl_4 \cdot PCl_5$ to $PCl_3$, heating the reaction mixture to about 130° C. to vaporize $PCl_3$ and excess phosphorus therefrom, thereafter heating the reaction mixture to about 300 to 320° C. to vaporize $ZrCl_4$ and condensing the vaporized $ZrCl_4$.

References Cited in the file of this patent

FOREIGN PATENTS

| Number | Country | Date |
|---|---|---|
| 221,802 | Great Britain | Dec. 8, 1925 |

OTHER REFERENCES

J. W. Mellor's "A Comprehensive Treatise on Inorganic and Theoretical Chemistry," vol. 7, 1927 ed., pages 143 and 145; vol. 8, 1928 ed., pages 789 and 1025. Longmans, Green and Co., N. Y.